Figure 1:
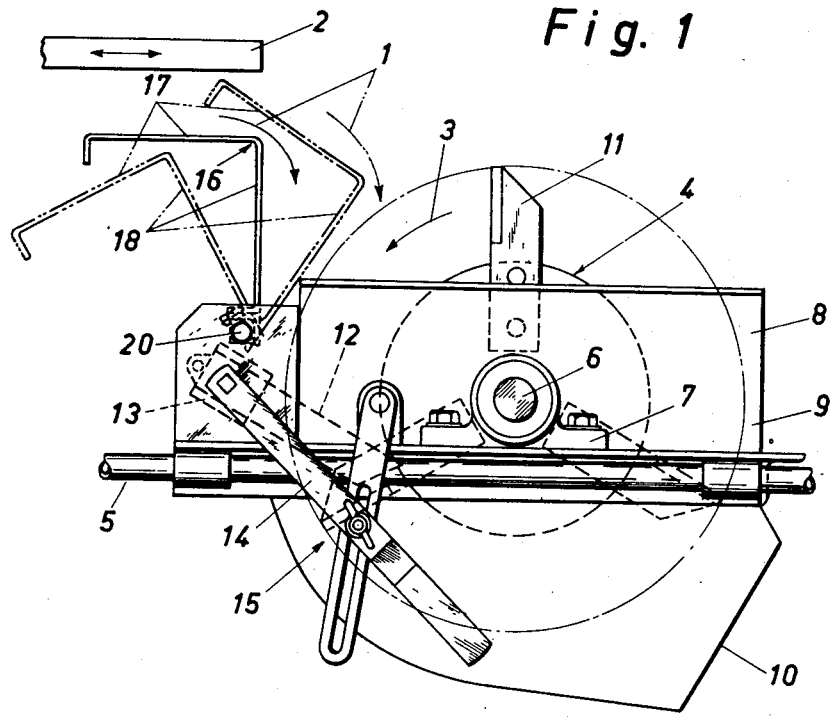

June 16, 1964    A. B. GRÖNBERG    3,137,332
SCREEN DEVICE IN CUTTERS FOR DISINTEGRATING STRAW
AND SIMILAR MATERIAL
Filed Jan. 11, 1963

INVENTOR.
Anton Bertil Grönberg
BY
Cushman, Darby & Cushman

3,137,332
SCREEN DEVICE IN CUTTERS FOR DISINTEGRATING STRAW AND SIMILAR MATERIAL
Anton Bertil Grönberg, Villa Karlsborg, Ottum, Sweden
Filed Jan. 11, 1963, Ser. No. 250,839
Claims priority, application Sweden Jan. 16, 1962
4 Claims. (Cl. 146—117)

My invention has reference to cutters for the disintegration of straw and similar material comprising a rotor having a plurality of arms with cutting edges extending from its shaft, said arms at the rotation of the rotor passing between a plurality of arms arranged in a row and preferably also provided with cutting edges, the last mentioned arms serving as a grate at the disintegration of the straw material by means of the rotor arms.

Especially when such machines are attached to a combine below its straw discharge whereby the feeding of the straw material to the cutter can vary there is sometimes a risk for the formation of vaults of the straw material above the rotor in such a way that the straw material is not caught by the rotor arms. It also happens when treating light and bulky material, e.g. seed straw, that this material is lifted by air streams—created by the rotor—from the cutter housing and does not fall down into the housing at all and thus is not reached by the rotor arms. On the other hand, if the material is heavy enough not to be lifted by upward air streams but is very bulky, the feeding opening above the rotor must be large enough for preventing the vault formation described in the aforegoing.

The present invention has for its purpose to eliminate the drawbacks described here above. For this purpose the main feature of the invention is that the cutter comprises an angularly bent screen arranged on the side of the disintegrator situated close to the combine and above the grate arms, said screen having one upward branch and one branch extending under the vibration sieve of the combine, said screen being journalled in a known way about a shaft at the lower edge of the screen and adapted to be adjusted to and clamped in different inclining positions. Due to this foldable screen it is rendered possible to adjust the screen according to the straw material to be cut to such inclining positions that in every special case there is obtained a sufficiently large feeding opening for eliminating detrimental upward air streams. It will then be possible to use one and the same cutter for efficient disintegration of light, bulky straw material as well as of heavy, bulky straw material or normal straw material, e.g. wheat or rye straw, with varying humidity.

Figure 2:
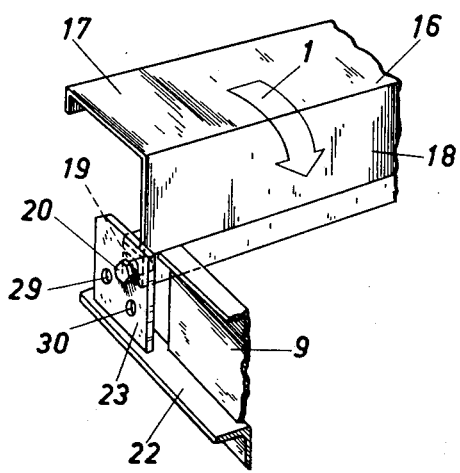
Figure 3:
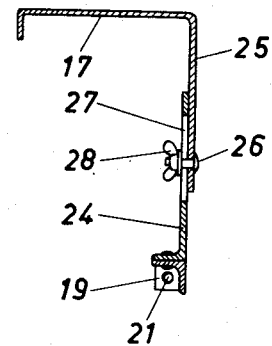

An example of a device in accordance with the invention will now be described with reference to the accompanying, partly diagrammatical drawing. In the drawing:

FIG. 1 is an end view of a cutter with a screen device according to the invention in different adjustment positions, FIG. 2 is a perspective view of one end of the screen with one of its bearings on the machine stand, and FIG. 3 shows a vertical cross section through the screen according to a modified embodiment of the invention.

The arrows 1 in FIGS. 1 and 2 indicate the direction in which the straw leaves the straw discharge of the combine of which in FIG. 1 there is shown only the rear shake sieve 2. The rotation direction of the rotor 4 of the machine is denoted 3. The cutter is connected to and carried by the combine in a suitable way by a carrying stand 5.

The shaft 6 of the rotor 4 is journalled in bearings 7 outside the gable walls 9 of the machine housing 8. The discharge opening for the disintegrated straw has been denoted 10. The rotor 4 comprises a number of rows with substantially radially extending arms 11 having cutting edges and being arranged in such a way that they pass in the spaces between parallel arms 12 also provided with cutting edges and being arranged at a certain distance from each other. These arms 12 extend into the housing 8 from one longitudinal wall of the same and serve as a grate for the straw material at its disintegration. The grate arms 12 are attached to a supporting beam 13 extending parallel to the shaft 6 and being turnable with a lever 14 and fixable by means of a clamping device 15. By means of the last mentioned device it is possible to adjust the inclination of the grate arms 12 and thus also the cutting angle of the latter.

Above the grate arms 12 there is arranged an angular screen 16 the upper branch of which extends under the vibration sieve and is denoted with 17 and the upward branch of which has been denoted 18. The screen 16 is journalled about the lower longitudinal edge (see FIG. 1) of the branch 18 and fixable in adjusted position. According to FIGS. 2 and 3 the lower edge of the branch 18 has by welding or in any other way been provided with nuts 19 into which bolts 21 with heads 20 can be screwed, said bolts 21 extending through a bracket extending upwardly from the machine stand 22. The bolts 21 which are coaxial thus serve on one hand as carrying pins and on the other hand as clamping means for attachment of the screen 16 in adjusted inclination position.

When normal straw material, e.g. common wheat or rye straw, is to be cut, the screen 16 shall take essentially the intermediary position shown with unbroken lines in FIG. 1. However, in case light straw material, e.g. seed straw, is to be cut, the screen 16 is folded down to the right inclination position shown with dash and dot lines. Due to the fact that the screen branch 18 in this position is situated closer to the motion path of the rotor arms 11, there is obtained a certain suction effect, causing the light material to slide down on the branch 17 against the grate arms 12. Thus, detrimental upward air streams are not occurring here. When bulky and rather heavy material in great quantities is fed to the cutter, a great feeding opening is required and it is then suitable to swing the screen 16 to the left hand position shown with dash and dot lines in FIG. 1.

It might be advisable in certain cases to increase the width (height) of the upward branch 18. As shown in FIG. 3 this branch is divided into two parts 24 and 25. The part 25 is provided with a number of screws 26 extending through each their vertical slot 27 in the other branch part 24 and is provided with a wing nut 28 for clamping the branch portions 24 and 25 against each other when the branch portion 25 carrying the transverse branch portion 17 has been moved to the desired level.

The bracket 23 is provided with supplemental holes 29, 30 to be passed through by the bolt 21 whereby it is rendered possible to move the screen 16 as a whole away from or closer to the rotor 4 if required.

The present invention has been described in detail above for purposes of illustration only and is not intended to be limited by this description or otherwise except as defined in the appended claims. Modifications of the screen could be carried out within the scope of the invention. E.g. at its lower edge the screen may be provided with coaxial trunnions or a longitudinal shaft which with its ends are carried in the brackets 23. On the free end of this shaft or on one of the trunnions it is possible to attach a lever for swinging and adjusting the screen also during operation of the machine. The machine should then be provided with a special device for fixing the screen in adjusted position. The adjustment position of the screen can be read by means of the inclination of the lever, i.e. the lever can serve as an index to be read on a scale behind the lever.

What I claim is:

1. In combination with a threshing machine having an outlet for straw or the like: a cutting device disposed below said outlet for receiving straw or the like, said cutting device including a plurality of spaced stationary grate arms and a rotatable shaft carrying a plurality of radially extending cutter arms which pass between the grate arms; and a straw conducting member above said grate arms and below said outlet for receiving straw from said outlet and conducting it into the path of the movable arms, said member comprising a first branch and a second branch extending generally perpendicularly to said first branch, said first branch facing generally toward said outlet and said second branch facing generally toward said shaft; and means mounting said member for adjustable swinging movement toward and away from said shaft about an axis at the lower edge of said second branch.

2. A cutter for disintegrating straw or the like comprising: a generally open topped housing; a plurality of spaced stationary grate arms within said housing; a horizontal rotatable shaft within said housing carrying a plurality of radially extending cutter arms which pass between the grate arms; and a straw conducting member above said grate arms for guiding and conducting straw or the like into the path of the cutter arms, said member comprising a first branch and a second branch extending generally perpendicularly to said first branch, said first branch facing generally upwardly and said second branch facing generally toward said shaft; and means mounting said member for adjustable swinging movement toward and away from said shaft about an axis at the lower edge of said second branch and extending parallel to said shaft.

3. A cutter as in claim 2 wherein said second branch comprises two parts adjustably movable relatively to each other in a vertical direction so that said second branch can be widened and so that said first branch can be adjusted to a higher level.

4. A cutter as in claim 3 wherein one of said parts of said second branch has vertical slots therein and wherein clamping screws extend from the other of said pieces through said slots.

References Cited in the file of this patent

UNITED STATES PATENTS

| | | |
|---|---|---|
| 2,842,175 | Thompson | July 8, 1958 |
| 2,862,536 | Gronberg | Dec. 2, 1958 |
| 3,027,925 | Gronberg | Apr. 3, 1962 |